J. Rich.
Lathe Chuck.
Nº 94,239.   Patented Aug. 31, 1869.
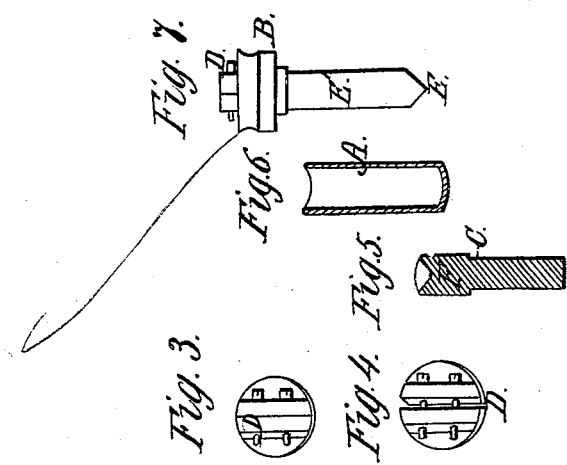
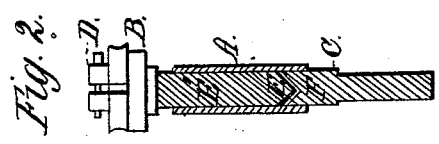
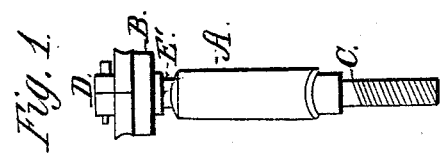
Witnesses,
Frank Rust
D. W. Ockley
Inventor:
John Rich

United States Patent Office.

JOHN RICH, OF PAINESVILLE, OHIO.

Letters Patent No. 94,239, dated August 31, 1869.

---

IMPROVED LATHE-CHUCK.

---

The Schedule referred to in these Letters Patent and making part of the same.

---

*To all whom it may concern:*

Be it known that I, JOHN RICH, of Painesville, in the county of Lake, and State of Ohio, have invented certain Improvements in Lathe-Chucks; and I do hereby declare the following is a full and exact description thereof, which will enable those skilled in the art to make and use the same, reference being had to the accompanying drawings, and letters of reference marked thereon, in which—

Figure I is a view of the chuck, complete in all its parts, in which—

A is a tube or collar.

B, head, with pair of vise-jaws D secured on the head, and pivot E' on end of shaft E, as shown in Fig. II.

C, screw, with its head countersunk at F, as shown in Fig. II.

Figure II is a longitudinal section.

A, tube.
B, head.
C, screw.
D, vise-jaws.
E', shaft.
E, pivot point.
F, countersink in screw C.

Figure III. D, vise-jaws closed.

Figure IV, view of vise-jaws opened.

Figures V, VI, VII, sectional views of chuck, showing the collar A, head B, vise-jaws D, shaft E', pivot E, screw C, F, head of screw C, countersunk.

The letters of reference indicate similar parts in all the figures.

The improvements herein referred to consist in the employment of a tube or collar A, secured to the end of the screw C, the screw C being secured to the lathe. The shaft E' is covered with cement, and passed into the collar A, the pivot point E being pressed into the countersink in screw C.

The following is a description of the construction and operation of my improvement:

It consists in a chuck composed of a tube or collar, attached by being driven tightly on the screw-plug C, which is screwed into the lathe mandrel.

The shaft E' is loosely fitted to the tube or collar, and coated with shellac-cement, then pressed into the collar, and heated by a lamp placed under the tube.

The article on which the pivot is to be turned is placed in the vise-jaws D, and secured by the screws in the jaws. The lathe is revolved during the heating of the tube. Then, by placing a piece of peg-wood on the lathe-rest, and pressing lightly against the article to be centred, the centre will be formed by the self-adjustment of the shaft in the soft cement in the tube.

In all the chucks of the present make, it is difficult to secure a true centre. In placing shafts of different diameters in the chucks now in use, the centres are changed by taking them out and placing them back, making it difficult to centre them twice alike.

In my improvement, if the centre should be destroyed by removing the article, the tube can be reheated and the centre found by the operation of using the peg-wood.

This improvement is to obviate the necessity of waxing in the piece to be turned, which was the only true way of having a pivot run true.

What I claim as my invention, and desire to secure by Letters Patent, is—

1. Constructing a lathe-chuck, with the collar A, the shaft E', with its convex centre E, the screw-plug C, with concave centre F, the shaft E' secured in the tube or collar A by shellac-cement, for the purpose as described.

2. The combination of the tube or collar A, shaft E', screw-plug C, head B, and vise-jaws D, the whole combined as described.

JOHN RICH.

Witnesses:
FRANK RUST,
D. W. OAKLEY.